T. H. BLACK.
PLACE FINDER FOR MAPS.
APPLICATION FILED FEB. 24, 1917.
1,245,311.
Patented Nov. 6, 1917.
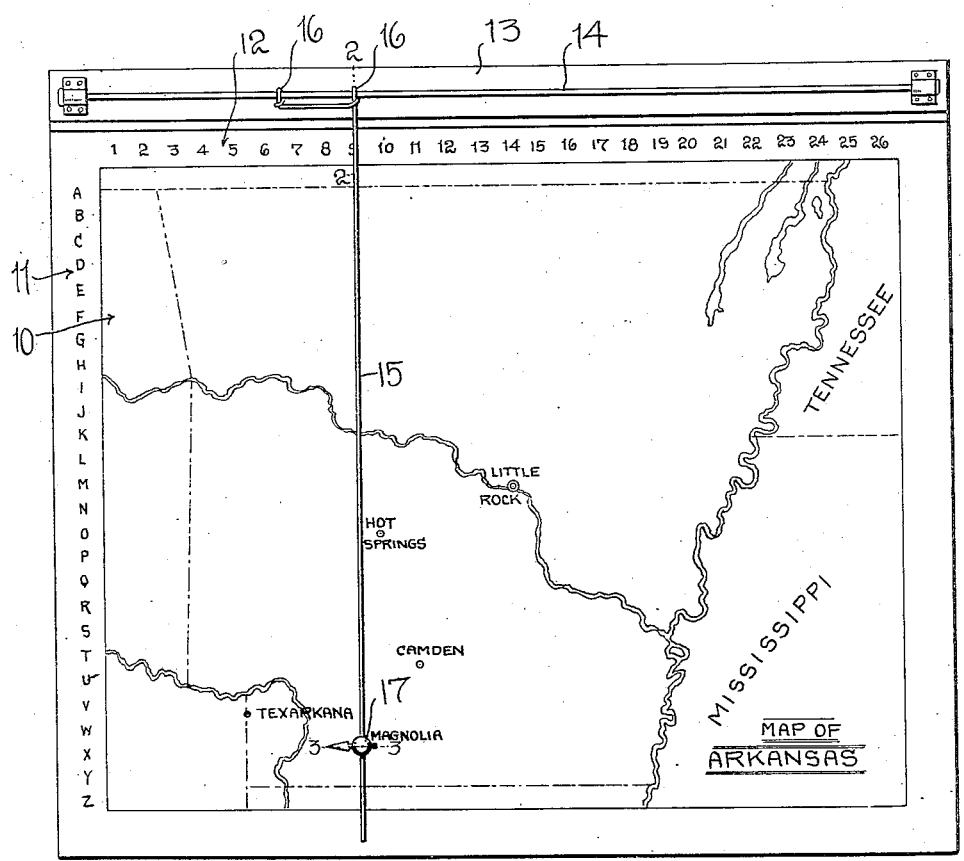
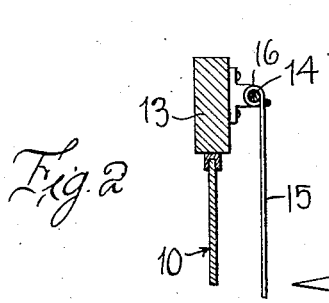
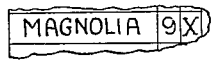
Inventor
T. H. Black

UNITED STATES PATENT OFFICE.

TRACY H. BLACK, OF MAGNOLIA, ARKANSAS.

PLACE-FINDER FOR MAPS.

1,245,311.  Specification of Letters Patent.  Patented Nov. 6, 1917.

Application filed February 24, 1917.  Serial No. 150,836.

*To all whom it may concern:*

Be it known that I, TRACY H. BLACK, a citizen of the United States, residing at Magnolia, in the county of Columbia and State of Arkansas, have invented certain new and useful Improvements in Place-Finders for Maps, of which the following is a specification, reference being had to the accompanying drawings.

This invention relates to maps, and more particularly to means for finding places on maps.

In the use of maps, it is sometimes extremely difficult to locate any particular place upon the map because of the small size of the lettering and also because of the multiplicity of place names on the map. Furthermore, even after a particular location has been found on the map, if the person using the map turns away, it becomes again difficult to relocate the place on the map.

The general object of my invention is to provide means for avoiding this difficulty so that any town, city or village, or any other location on the map, may be readily found by reference to an index and whereby a pointer, or other index member, may be located at the place desired on the map so that the person using the map may turn to it and immediately find it.

A further object of the invention is to provide an index of this character so constructed that it may be turned out of the way when not in use and so as not in any way to obscure the map and further to provide a device which may be applied to and used in conjunction with maps, as ordinarily constructed today or may be made as part of the map itself.

Other objects will appear in the course of the following description.

The invention is described in the accompanying drawings, in which:

Figure 1 is a face view of a map showing my marker applied in conjunction therewith;

Fig. 2 is a sectional view on the line 2—2 of Fig. 1;

Fig. 3 is a transverse sectional view on the line 3—3 of Fig. 1;

Fig. 4 is a fragmentary view of the map index, and

Fig. 5 is a fragmentary elevation of the rod 15 provided with indicating letters.

Referring to the drawings, 10 designates a map, as for instance, a map of a portion of the State of Arkansas. The map, of course, is of the usual and ordinary form and though relatively few place names are shown upon the map, it is to be understood that the map is to have as many place names and place indications, as ordinarily found on maps. Extending along one margin of the map is a series of letters, as for instance, the letters A to Z, or any other desired characters, and extending along another margin of the map at right angles to the first named margin is a series of numerals, as from 1 to 26, or any other desired characters in series. In conjunction with the map there is to be used an index having the place names which are found upon the map disposed in alphabetical order and in conjunction with each place name are two indicating marks or characters, one referring to the column 11, wherein are the references letters A to Z, and the other referring to the column or margin 12, wherein are the numerals 1 to 26. The use of this index will be obvious later.

Disposed in conjunction with the map, as for instance, above the map, or attached thereto in any suitable manner, is a wooden or metal supporting base 13 carrying thereon a longitudinally extending, relatively stiff, wire, or rail 14. Spaced from the wooden base and slidingly mounted on this rail 14 is an arm 15 which may be made of stiff wire, or of any other suitable material, this arm being of sufficient length to extend entirely across the map, as from top to bottom. As illustrated, this wire 10, at its point of connection with the rail 14, is formed with a pair of eyes 16, which slidingly and rotatably engage the rail 14, so that the index wire or rail may be shifted longitudinally along the rail 14 entirely across the map, or may be turned up in a position above the map, if desired, to get it out of the way.

Mounted upon the rod or rule 15 is a slide 17, which is slidably mounted upon the rod or wire in any suitable manner and which has preferably enough frictional engagement with the rod or wire 15 so that it will stay wherever it is placed. A set screw may be used, if desired, to hold the marker 17 in place on the rod. This marker may be of any suitable construction and formed at the index point, if desired, or it may have the form of a ball or bead. I do not wish to be limited to any particular construction for this marker, as it is only necessary that it shall have sliding engagement with the rod or wire 15.

Now if it be desired to find a particular town, I use the index referred to. A portion of this index is illustrated in Fig. 4 and it will be seen that in connection with the name of each town, there is disposed a numeral referring to the column 12 and in a letter referring to the column 11. Thus, for instance, the town of Little Rock has, in conjunction with its name, the numeral 14 and the reference letter M. To find this town upon the map, the rod 15 is shifted along the rail 15 so that the rod will intersect the numeral 14 in the column 12 and the marker 17 is shifted along the rod 15 until it is opposite to the letter M. Under these circumstances the marker 17 will be disposed in conjunction with the dot or circle representing the town of Little Rock. In the actual use of the device, the rod 15 will first be shifted so as to extend along the column 11 and then the marker will be shifted to the proper reference letter and then the rod 15 will be shifted laterally until it intersects the proper numeral, when the marker will indicate the proper town. Again, for instance, if it be desired to find the town of Magnolia, reference is had to the index, wherein it is seen that Magnolia is associated with the numeral 9 and the letter X. The marker is shifted on the rod 15 to the letter X and the rod 15 is shifted so as to intersect the numeral 9 in column 12, whereupon the marker will be disposed in more or less exact register with the town of Magnolia. Examples of the manner of using this finder need not be multiplied, as its use will be obvious.

The device is particularly convenient for school teachers, using wall maps, but it is obvious that its use is not limited to this and that it may be used in conjunction with any map. Where maps are already made and are of the common variety, the wood base may be permanently or detachably disposed parallel to the upper edge of the map in a device used as before described, but where the maps are made with this device, it is obvious that the map may be attached at its upper edge to the wood base or may be framed, the base 13 forming part of the frame.

It will also be obvious that many minor changes may be made in the details of the device, without departing from the spirit of the invention as defined in the appended claims.

Thus the characters which are shown as being disposed in the column 11 upon the left hand side of the map frame might be disposed upon the right hand side and these characters might be disposed on the rod 15 itself as illustrated in Fig. 5 wherein the rod is designated 15ª. It will be seen that the device is particularly useful for pupils who are just learning to use maps. It is very difficult for a beginner to locate a place on a map as he can not run the section lines properly and it is obvious that the device will be equally useful for large tourists' maps hanging in hotels and railway stations.

The device may be very cheaply made and it is obvious that the index illustrated in Fig. 4 might be printed as part of the map itself.

Having thus described my invention what I claim is:

1. The combination of a map having upon one margin a series of characters and upon a margin at right angles to the first named margin another series of characters, of a finder comprising a base extending parallel to one margin of the map, a rod mounted upon the base and extending across the map and shiftable longitudinally along the base so as to intersect any one of the characters of one series, and a marker slidably mounted upon said rod and adapted to be positioned on lines extending from any one of the other series of characters.

2. The combination with a map having upon one margin a series of characters, a finder including a rod slidably supported with relation to the map and shiftably mounted in connection therewith so as to be shifted across the map and intersect any one of said first named characters, one of said parts having thereon a series of reference characters disposed at spaced intervals and extending at right angles to the first named reference characters, and a marker slidably mounted upon the rod and coacting with said second named reference characters.

3. The combination with a map having upon one margin a series of letters and upon the other margin a series of numbers, of a finder comprising a base mounted parallel to one margin of the map and having a rail supported thereon, a rod having rotatable and sliding engagement with the rail and normally lying across the face of the map and intersecting any one of the numerals of one series, and a marker slidably mounted upon the rod and adapted to be shifted on the rod into a position of alinement with any one of the letters on the margin of the map, the place names on said map being disposed at intersections of or adjacent intersections of lines extending in one direction from said numerals and in the other direction from said letters.

4. The combination with a map having upon one margin a series of characters, a finder including a rod slidably supported with relation to the map and shiftably mounted thereon so as to intersect any of said first named characters, and a marker slidably mounted upon the rod, said rod being provided with reference characters disposed at spaced intervals along its length and with which the marker is adapted to coact.

In testimony whereof I hereunto affix my signature in the presence of two witnesses.

TRACY H. BLACK.

Witnesses:
J. A. WADE,
E. C. LYLE.